(12) United States Patent
Nasu

(10) Patent No.: US 7,116,313 B2
(45) Date of Patent: Oct. 3, 2006

(54) ELECTRONIC APPARATUS AND OPERATION DEVICE FOR OPERATING THE APPARATUS

(75) Inventor: Tetsutaro Nasu, Okayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 342 days.

(21) Appl. No.: 10/387,129

(22) Filed: Mar. 13, 2003

(65) Prior Publication Data

US 2003/0210237 A1  Nov. 13, 2003

(30) Foreign Application Priority Data

Mar. 20, 2002  (JP) ............... 2002-078377

(51) Int. Cl.
*G09G 5/00* (2006.01)
(52) U.S. Cl. .............. 345/173; 345/157; 345/160
(58) Field of Classification Search .......... 345/161, 345/156–160, 168, 173–4
See application file for complete search history.

(56) References Cited

U.S. PATENT DOCUMENTS

| | | | | |
|---|---|---|---|---|
| 4,931,781 A | * | 6/1990 | Miyakawa | 345/160 |
| 5,483,261 A | * | 1/1996 | Yasutake | 345/173 |
| 5,510,812 A | * | 4/1996 | O'Mara et al. | 345/161 |
| 5,543,592 A | * | 8/1996 | Gaultier et al. | 200/6 A |
| 5,815,139 A | * | 9/1998 | Yoshikawa et al. | 345/157 |
| 5,977,888 A | * | 11/1999 | Fujita et al. | 341/34 |
| 6,225,980 B1 | * | 5/2001 | Weiss et al. | 345/161 |
| 6,326,948 B1 | * | 12/2001 | Kobachi et al. | 345/157 |
| 6,538,639 B1 | * | 3/2003 | Takahashi | 345/161 |
| 6,567,072 B1 | * | 5/2003 | Watanabe | 345/161 |
| 6,603,085 B1 | | 8/2003 | Oya et al. | |
| 2002/0196231 A1 | * | 12/2002 | Dobies et al. | |

FOREIGN PATENT DOCUMENTS

| | | |
|---|---|---|
| CN | 2398676 Y | 9/2000 |
| CN | 1320929 A | 7/2001 |
| WO | WO 01/61637 A1 | 8/2001 |

OTHER PUBLICATIONS

Dobies et al. "Pointing Device For . . ." U.S. Appl. No. 09/309,037 (Filed: May 10, 1999).*

* cited by examiner

*Primary Examiner*—Kent Chang
*Assistant Examiner*—Tammy Pham
(74) *Attorney, Agent, or Firm*—McDermott Will & Emery LLP

(57) ABSTRACT

In an electronic apparatus, an inputting-operation device includes a touch panel actuated by a push button of a switch jointed to a laterally-movable strip. As the single switch moved laterally, the push button presses down the touch panel for the panel to output a first signal. The first signal makes a pointer shifts to a corresponding position on a display for selecting an item. The selected item is then actuated by a second signal produced by the switch pressing down the touch panel. This operation allows the pointer to shift to the selected item and allows the selected item to be actuated in a continuous sequence by a finger of an operator holding but not departing from a particular portion of the inputting-operation device.

11 Claims, 4 Drawing Sheets

ELECTRONIC APPARATUS AND OPERATION DEVICE FOR OPERATING THE APPARATUS

FIELD OF THE INVENTION

The present invention relates to an electronic apparatus equipped with an inputting-operation device for inputting coordinates of positions while viewing a display.

BACKGROUND OF THE INVENTION

An electronic apparatus equipped with a display and an inputting-operation device for moving a pointer to mark selections displayed on the display. It is particularly desired to improve the operability of the inputting-operation device.

A conventional electronic apparatus equipped with a conventional inputting-operation device will be explained. FIG. 6 is a front view of the conventional electronic apparatus. FIG. 7 is a schematic diagram of the apparatus. The electronic apparatus includes a display 2 mounted to the front side at a right portion of a case 1. An inputting-operation device 3, namely, a cross-shaped switch, and an enter switch 4 are also mounted to the front side at a left portion of the display.

The case 1 contains a circuit board (not shown) which carries components and a controller 5 for controlling operations of the components. The controller 5 operates in responsive to input and output signals from the display 2, the inputting-operation device 3, and the enter switch 4 for initiating their corresponding operations.

In the conventional electronic apparatus, the cross-shaped switch or inputting-operation device 3 is repeatedly pressed down by an operator watching a screen of the display 2 for moving the pointer to a desired task or location on the screen. In response to the pressing, a signal is output from the cross-shaped switch and transferred to the controller 5 for processing the signal in a predetermined manner to move the pointer to the desired location on the display 2.

When the pointer arrives at the desired location, the operator stops the pressing of the cross-shaped switch, and then presses the enter switch 4 to determine the task at the location for performing an operation defined by the task. Similarly, a signal is output from the enter switch 4 and transferred to the controller 5 for processing the signal to execute the task desired by the operator.

The conventional electronic apparatus permits the operation of the task to be selected with the cross-shaped switch or inputting-operation device 3 for moving the pointer and to be then executed corresponding to the enter switch 4. More particularly, each operation has to be performed at plural steps, which is unfavorable in readiness.

SUMMARY OF THE INVENTION

An electronic apparatus including an operation device which includes a touch panel for producing a first signal corresponding to a position where the touch panel is pressed; and a switch including a push button arranged for moving substantially in parallel with the touch panel and for pressing down the touch panel. The switch produces a second signal when the push button is pressed down.

The electronic apparatus hence allows a continuous sequence from shifting the pointer to a selection and actuating the selection to be performed with a finger of an operator holding the apparatus, but not departing from a single operating portion of the operation device having a simple arrangement.

DESCRIPTION OF THE PREFERRED EMBODIMENT

Figure 1:
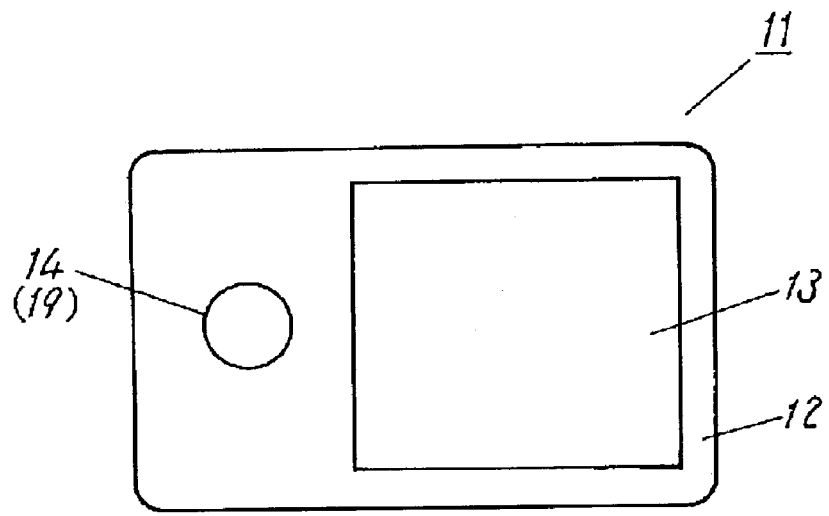
FIG. 1 is a front view of an electronic apparatus according to an exemplary embodiment of the present invention.
Figure 2:
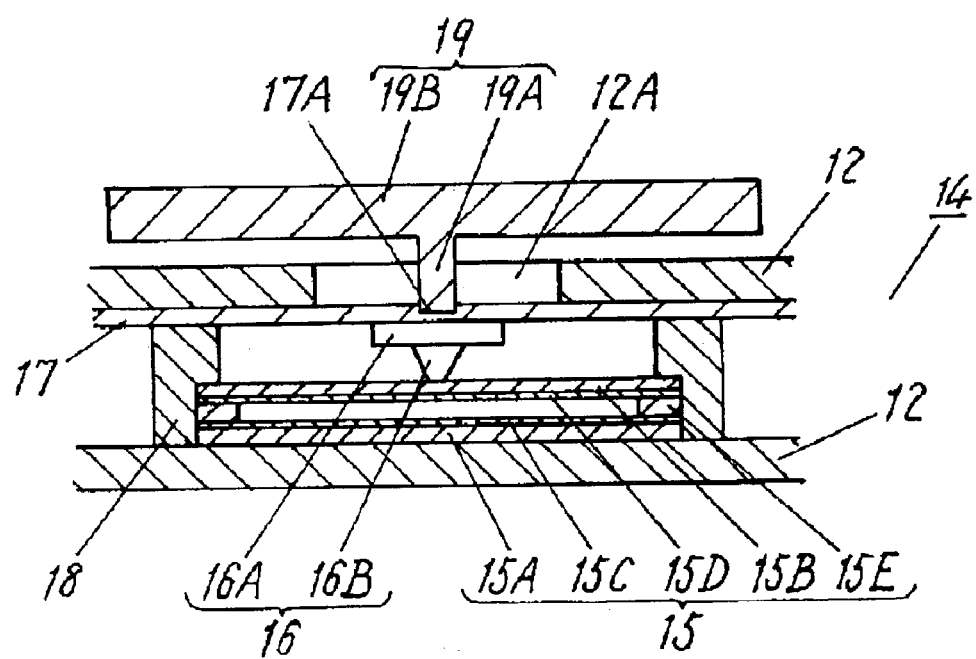
FIG. 2 is a cross sectional view of an inputting-operation device in the electronic apparatus of the embodiment.
Figure 5:
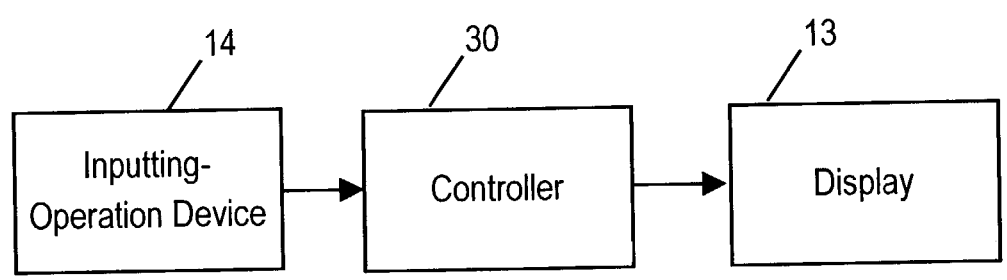
FIG. 5 is a block diagram of the electronic apparatus of the embodiment.
Figure 6:
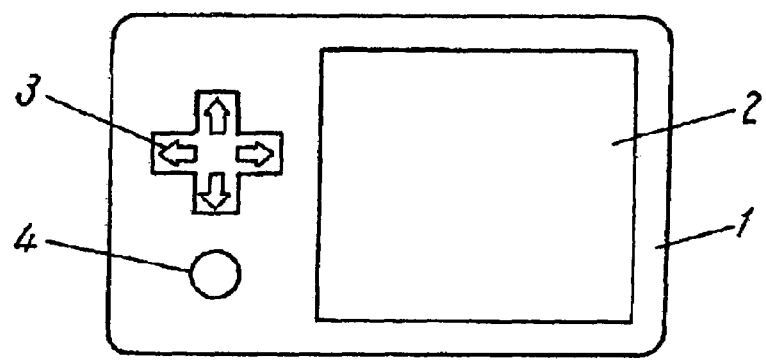
FIG. 6 is a front view of a conventional electronic apparatus.
Figure 7:
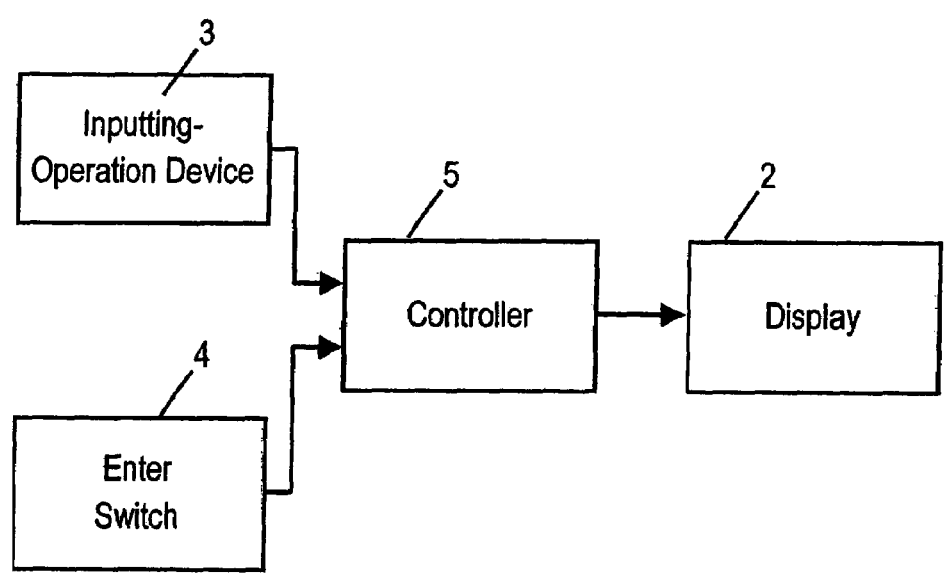
FIG. 7 is a block diagram of the conventional electronic apparatus.

FIG. 1 is a front view of an electronic apparatus according to an exemplary embodiment of the present invention. FIG. 2 is a cross sectional view of an inputting-operation device in the electronic apparatus. FIG. 5 illustrates an arrangement of the electronic apparatus. The electronic apparatus 11 of the embodiment includes a case 12, a display 13 mounted on the front side at right portion of the case 12, and an inputting-operation device 14 provided at the left portion of the display 13. The case 12 contains a printed circuit board (not shown) on which various components and a controller 30 for controlling action of the components are mounted.

The inputting-operation device 14 will be explained referring to FIG. 2. The inputting-operation device 14 includes a touch panel 15 installed in the case 12 and a switch 16 which can slide on the touch panel 15 and actuates the panel 15.

The touch panel 15 of a resistive membrane type consists mainly of a lower insulating substrate 15A and an upper insulating substrate 15B of elastic material which are facing each other as distanced by an insulating spacer 15E. Electrically-conductive membranes 15C and 15D are provided on the facing sides of the insulating substrates 15A and 15B, respectively. In FIG. 2, the touch panel 15 is illustrated as enlarged in its thickness direction for easy explanation.

The switch 16 of press-down type includes a main body 16A containing switch contacts and a push button 16B projecting from the main body 16A. While the push button 16B extends downward, the main body 16A is fixed at the bottom of a movable strip 17 which can move laterally. The push button 16B has a spherical shape at its distal end.

The movable strip 17 is supported from below by an elastic spacer 18 disposed on a rim of the touch panel 15 and is depressed from above by the lower side of the case 12.

The push button 16B of the switch 16 fixed at the movable strip 17 directly contacts the upper insulating substrate 15B of the touch panel 15. Since the movable strip 17 is supported by the elastic spacer 18, the upper insulating substrate 15B of the touch panel 15 is normally inhibited from deflecting. Accordingly, the touch panel 15 outputs no signal at the normal state shown in FIG. 2.

The movable strip 17 allows the push button 16B of the switch 16 to move in parallel with the touch panel in all directions throughout an operable area of the panel 15. The movable strip 17 has a knob-mounted portion 17A provided in its upper side at a position corresponding to the push button 16B of the switch 16. The lower center pin 19A of a control knob 19 fits into the knob-mounted portion 17A for operating the switch 16.

The movable strip 17 laterally moves so that the push button 16B of the switch 16 shifts in a desired direction over the operable area of the touch panel 15. This movement is implemented by operating the lower center pin 19A of the control knob 19 through an opening 12A provided in the case 12. The opening 12A is protected with a knob portion 19B of the control knob 19 situated outside the case 12.

The size of the opening 12A may be determined depending on a signal change according to the movement on the touch panel 15, as explained later in detail.

The controller 30 receives a first signal output from the touch panel 15 and a second signal output from the single switch 16. The controller 30 in the electronic apparatus of this embodiment operates in response to the signals from the inputting-operation device 14.

An operation of the electronic apparatus 11 will be explained.

First, an operator views items displayed on the display 13 and lightly holds and drives the knob portion 19b of the control knob 19 in a lateral direction to shift the pointer to one of the items.

Figure 3:
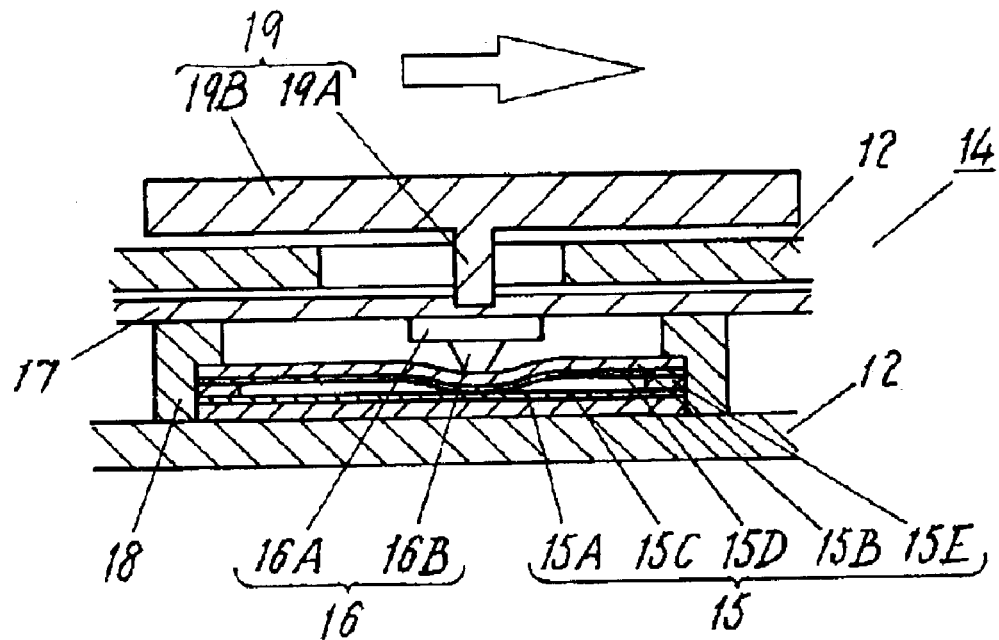
FIG. 3 is a cross sectional view of the inputting-operation device of the embodiment.

This operation allows the movable strip 17 to press down the elastic spacer 18, as shown in FIG. 3, hence lowering the push button 16B and deflecting the upper insulating substrate 15B of the touch panel 15.

As the movable strip 17 moves laterally, the conductive membranes 15C and 15D of the touch panel 15 directly contact with each other. More specifically, a position of the direct contact between the conductive membranes 15C and 15D changes from one position to another, thus causing the touch panel 15 to output the first signal. The touch panel 15 shown in FIG. 3 is illustrated as enlarged in its thickness direction for easy explanation.

During the change of the position, the switch 16 is designed not to be actuated unintentionally with a first force to the push button 16B for the changing but to actuated only when urged by a second force greater than the first force.

The elasticity of the elastic spacer 18 may be greater than the second force for actuating the switch 16. Accordingly, any unintentional force over the touch panel 15 can be absorbed or cushioned by the elasticity of the elastic spacer 18, thus reducing any unwanted actuation of the switch 16 during the lateral movement of the control knob 19.

The first signal output through the lateral movement is transferred to the controller 30. The controller 30 performs a controlling operation in response to the first signal for moving the pointer to a desired position on on the display 13.

The amount of the shift of the pointer corresponding to the movement from the first signal may arbitrarily be determined. For example, when the opening 12A in the case 12 is small, the amount of the shift of the pointer may be increased for the movement.

As the movable strip 17 laterally moves in all directions, the pointer can trace any desired curve as well as a circle and a straight line. Whenever the lateral movement is canceled, the touch panel 15 and the elastic spacer 18 return back to their normal condition shown in FIG. 2.

Figure 4:
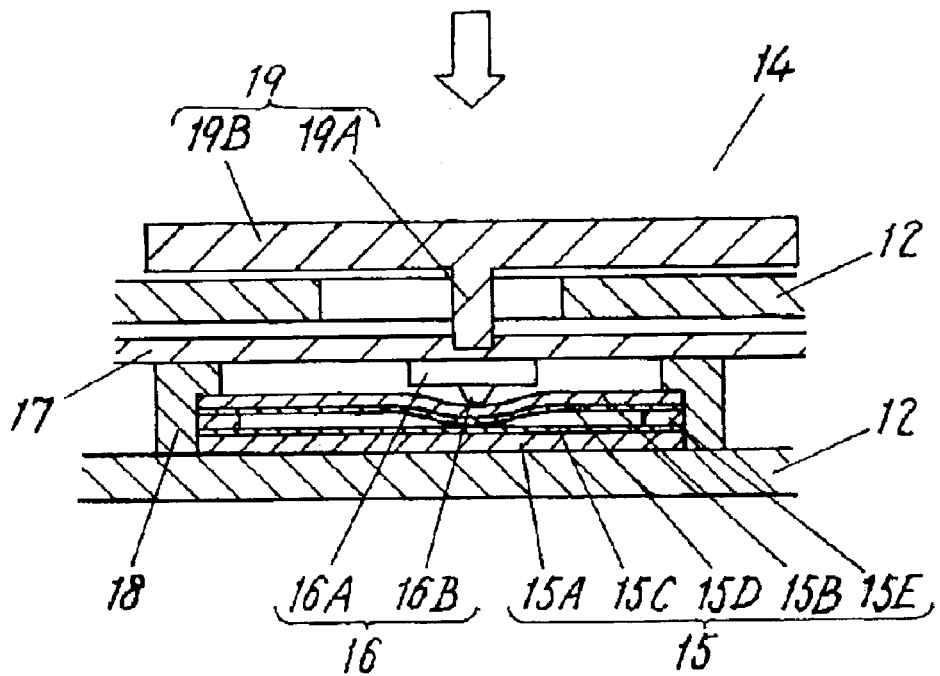
FIG. 4 is a cross sectional view of the inputting-operation device in the embodiment.

If the pointer arrives at the desired position on the display 13, the operator presses the control knob 19 at the knob portion 19B. This operation causes the movable strip 17 to move downward by pressed through the elastic spacer 18, as shown in FIG. 4. As the result, the push button 16B of the switch 16 receives a counter force from the touch panel 15, thus turning on the switch 16 and transmitting the second signal from the switch 16 to the controller 30.

The controller 30 performs a controlling operation in response to the second signal for marking and actuating a function defined by a position of the pointer.

When the control knob 19 is released from the pressing action, the movable strip 17 moves upward and lifts the switch 16, the touch panel 15, and the elastic spacer 18 to return them back to their normal condition shown in FIG. 2.

As set forth above, the electronic apparatus of this embodiment permits the operator to carry out both the lateral movement and the pressing operation in a continuous sequence with a finger not departing from but holding the control knob 19 of the inputting-operation device 14 which is composed of a small number of components. Since moving in all directions for the lateral movement, the control knob 19 allows the operator to arbitrarily move the pointer to a position and to actuate a desired function.

The first signal from the touch panel 15 is assigned to the movement of the pointer, and the second signal from the switch 16 is assigned to determining and actuating of the function, and however, they may be assigned to any other functions.

The touch panel 15 may be of a carbon touch pad type having the electrically conductive layers 15C and 15D made of carbon-containing material, thus contributing to low cost of the inputting-operation device 14. The touch panel 15 may be of any other type than the resistive membrane type as long as the signal can be output through the lateral movement of the push button 16B of the switch 16.

What is claimed is:

1. An apparatus comprising an operation device which includes:
    a touch panel for producing a first signal corresponding to a position where said touch panel is pressed; and
    a switch including a push button arranged for moving substantially in parallel with said touch panel and for pressing down said touch panel, said switch producing a second signal when said push button is pressed down.

2. The apparatus according to claim 1,
    wherein said operation device further includes a movable member arranged for moving in all directions substantially in parallel with said touch panel, and
    wherein said switch further includes a main body having said push button fixed thereto, and
    wherein said main body is coupled to said touch panel and is joined to said movable member to move together with said movable member.

3. The apparatus according to claim 2, wherein said operating device further includes an elastic member provided between said movable member and said touch panel, said elastic member being arranged not to deform by a force smaller than a force of actuating said switch.

4. The apparatus according to claim 1, wherein said touch panel includes:
    substrates facing each other; and
    electrically-conductive layers provided on respective facing sides of said substrates.

5. The apparatus according to claim 1, further comprising a controller for performing a predetermined process in response to said first and second signals.

6. The apparatus according to claim 5, further comprising a display for displaying a cursor moving according to a controlling of said controller corresponding to said first signal.

7. The apparatus according to claim 6,
wherein said display displays an item under control of said controller,
wherein said controller selects said item with said cursor, and
wherein said controller determines said selected item in response to said second signal.

8. An operation device comprising:
a touch panel for producing a first signal corresponding to a position where said touch panel is pressed; and
a switch including a push button arranged for moving substantially in parallel with said touch panel and for pressing down said touch panel, said switch producing a second signal when said push button is pressed down.

9. The operation device according to claim 8, further comprising a movable member arranged for moving in all directions substantially in parallel with said touch panel, wherein said switch further includes a main body having said push button fixed thereto, and
wherein said main body is coupled to said touch panel and is joined to said movable member to move together with said movable member.

10. The operating device according to claim 9, further comprising an elastic member provided between said movable member and said touch panel, said elastic member being arranged not to deform by a force smaller than a force of actuating said switch.

11. The operating device according to claim 9, wherein said touch panel includes:
substrates facing each other; and
electrically-conductive layers provided on respective facing sides of said substrates.

* * * * *